(12) United States Patent
Sardo

(10) Patent No.: US 10,363,655 B2
(45) Date of Patent: Jul. 30, 2019

(54) UPHOLSTERY INTERIOR INSTALLATION TOOL

(71) Applicant: Sikorsky Aircraft Corporation, Stratford, CT (US)

(72) Inventor: Joseph A. Sardo, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 88 days.

(21) Appl. No.: 15/528,345

(22) PCT Filed: Dec. 11, 2015

(86) PCT No.: PCT/US2015/065280
§ 371 (c)(1),
(2) Date: May 19, 2017

(87) PCT Pub. No.: WO2016/094818
PCT Pub. Date: Jun. 16, 2016

(65) Prior Publication Data
US 2017/0312911 A1 Nov. 2, 2017

Related U.S. Application Data

(60) Provisional application No. 62/091,029, filed on Dec. 12, 2014.

(51) Int. Cl.
*B25H 7/04* (2006.01)
*F16B 5/06* (2006.01)
*F16B 5/12* (2006.01)

(52) U.S. Cl.
CPC ............... *B25H 7/04* (2013.01); *F16B 5/065* (2013.01); *F16B 5/123* (2013.01)

(58) Field of Classification Search
CPC ............. B25H 7/04; F16B 5/065; F16B 5/123
USPC ........................................................ 33/666
See application file for complete search history.

(56) References Cited

U.S. PATENT DOCUMENTS

| | | | | |
|---|---|---|---|---|
| 2,435,256 A | * | 2/1948 | Brody | B23B 47/28 33/671 |
| 2,591,814 A | * | 4/1952 | Hill | B23B 47/28 33/672 |
| 2,922,211 A | | 1/1960 | Boyd | |
| 4,484,392 A | * | 11/1984 | DeFino | E04F 21/1855 33/647 |
| 5,179,787 A | * | 1/1993 | Ostrowski | A47H 1/10 33/528 |

(Continued)

OTHER PUBLICATIONS

Notification of Transmital of the International Search Report for International Application No. PCT/US2015/065280 dated Jan. 26, 2016; dated Feb. 12, 2016; 9 pages.

(Continued)

*Primary Examiner* — Yaritza Guadalupe-McCall
(74) *Attorney, Agent, or Firm* — Cantor Colburn LLP

(57) ABSTRACT

A panel installation tool is provided that includes a first portion configured to releasably engage with a panel, a second portion attached to the first portion and configured to releasably engage a structural component to retain the first portion with respect to the structural component, and a location indicator configured to enable marking on a panel surface a location through which a retaining element may be used to retain the panel to the structural component.

11 Claims, 7 Drawing Sheets

(56) References Cited

U.S. PATENT DOCUMENTS

| | | | |
|---|---|---|---|
| 5,623,767 A * | 4/1997 | Colavito | E04F 21/1855 33/647 |
| 5,624,200 A | 4/1997 | Beaulieu | |
| 6,158,137 A * | 12/2000 | Bramlett | G01B 5/02 33/27.03 |
| 6,185,831 B1 * | 2/2001 | Pluciennik | A47G 1/205 33/613 |
| 6,839,977 B1 * | 1/2005 | Truckner | E04F 21/26 33/476 |
| 6,898,862 B1 * | 5/2005 | Oberst | A47G 1/205 33/574 |
| 7,252,463 B2 * | 8/2007 | Valdez | E05D 11/0009 33/194 |
| 7,546,692 B2 * | 6/2009 | Simko | E04F 21/1855 33/613 |
| 7,676,941 B2 * | 3/2010 | Cruz | B44D 3/38 33/414 |
| 8,082,675 B1 * | 12/2011 | Schoenebeck | B25H 7/04 33/613 |
| 8,615,894 B1 * | 12/2013 | Schoenebeck | B25H 7/04 33/613 |
| 2002/0083611 A1 * | 7/2002 | Wegstein | B29C 51/262 33/645 |
| 2002/0170198 A1 * | 11/2002 | Rempe | E04F 21/1855 33/647 |
| 2004/0123478 A1 * | 7/2004 | Partin | E04F 21/1855 33/647 |
| 2009/0271970 A1 | 11/2009 | Hanley et al. | |
| 2009/0277032 A1 * | 11/2009 | Grant | B25C 7/00 33/645 |
| 2009/0293237 A1 | 12/2009 | Benedetti et al. | |
| 2011/0020092 A1 | 1/2011 | Bentrim et al. | |
| 2013/0031867 A1 * | 2/2013 | Duquette | E04F 21/1855 52/748.11 |
| 2013/0174406 A1 * | 7/2013 | Gori | F16B 37/046 29/525.01 |
| 2017/0312911 A1 * | 11/2017 | Sardo | F16B 5/065 |

OTHER PUBLICATIONS

Written Opinion of the International Searching Authority for International Application No. PCT/US2015/065280 dated Jan. 26, 2016; dated Feb. 12, 2016; 5 pages.

PCT International Preliminary Report on Patentability; International Application No. PCT/US2015/065280; International Filing Date: Dec. 11, 2015; dated Jun. 13, 2017; pp. 1-6.

* cited by examiner

UPHOLSTERY INTERIOR INSTALLATION TOOL

CROSS REFERENCE TO RELATED APPLICATIONS

This application is a National Stage application of PCT/US2015/065280, filed Dec. 11, 2015, which claims the benefit of U.S. Provisional Application No. 62/091,029, filed Dec. 12, 2014, both of which are incorporated by reference in their entirety herein.

BACKGROUND OF THE INVENTION

The embodiments herein generally relate to installation tools for paneling.

Paneling, and specifically upholstery paneling for interior components of vehicles and other structures, may require precise placement during installation in order to align a panel with the attachment mechanism that holds or retains the upholstery to the structure. Traditionally, markers and/or indicators are provided at or about the location adjacent to where an attachment or retention may be made. For example, masking tape may be placed below the location of an attachment or retention mechanism where a vertical panel may be attached to a wall or other similar structure. The masking tape may be marked to indicate how high from the tape an attachment mechanism is located, thus providing a technician with an approximate location of where to drill a hole through the panel to provide a complete attachment mechanism, e.g., a hole for a screw or other fastener to pass through and attach to a structure. Those of skill in the art will appreciate that this process may be inaccurate and/or time consuming.

BRIEF DESCRIPTION OF THE INVENTION

According to one embodiment, a panel installation tool is provided that includes a first portion configured to releasably engage with a panel, a second portion attached to the first portion and configured to releasably engage a structural component to retain the first portion with respect to the structural component, and a location indicator configured to enable marking on a panel surface a location through which a retaining element may be used to retain the panel to the structural component.

In addition to one or more of the features described above, or as an alternative, further embodiments may include, wherein the first portion and the second portion are integrally formed.

In addition to one or more of the features described above, or as an alternative, further embodiments may include, wherein the location indicator and the first portion are integrally formed.

In addition to one or more of the features described above, or as an alternative, further embodiments may include, wherein the first portion is adjustable between an open position and a closed position.

In addition to one or more of the features described above, or as an alternative, further embodiments may include, wherein, when in the closed position, a panel may be releasably retained within the first portion.

In addition to one or more of the features described above, or as an alternative, further embodiments may include, wherein the first portion includes a hinge.

In addition to one or more of the features described above, or as an alternative, further embodiments may include, wherein the location indicator is an aperture through the first portion.

In addition to one or more of the features described above, or as an alternative, further embodiments may include, wherein the location indicator comprises double-sided tape.

In addition to one or more of the features described above, or as an alternative, further embodiments may include, wherein the location indicator is at least one of a protrusion, a dye, an ink, a paint, a spike, and a needle.

In addition to one or more of the features described above, or as an alternative, further embodiments may include, wherein the location indicator is removably attached to the first portion and configured to transfer from the first portion to a panel when the first portion engages with the panel.

In addition to one or more of the features described above, or as an alternative, further embodiments may include, wherein the first portion forms a "U" shape or a "V" shape.

In addition to one or more of the features described above, or as an alternative, further embodiments may include, wherein the second portion is one of a smooth cylinder, a ribbed cylinder, and a threaded cylinder.

Technical features of the invention include providing accurate and efficient means for installing panels, such as upholstery panels, onto a surface such as a wall or other similar structure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Referring to FIGS. 1A-1D, a first exemplary embodiment of the invention is shown. FIGS. 1A-1D are schematic views of a panel installation 100 employing a locating tool 102 according to a first exemplary embodiment of the invention.

Figure 1A:
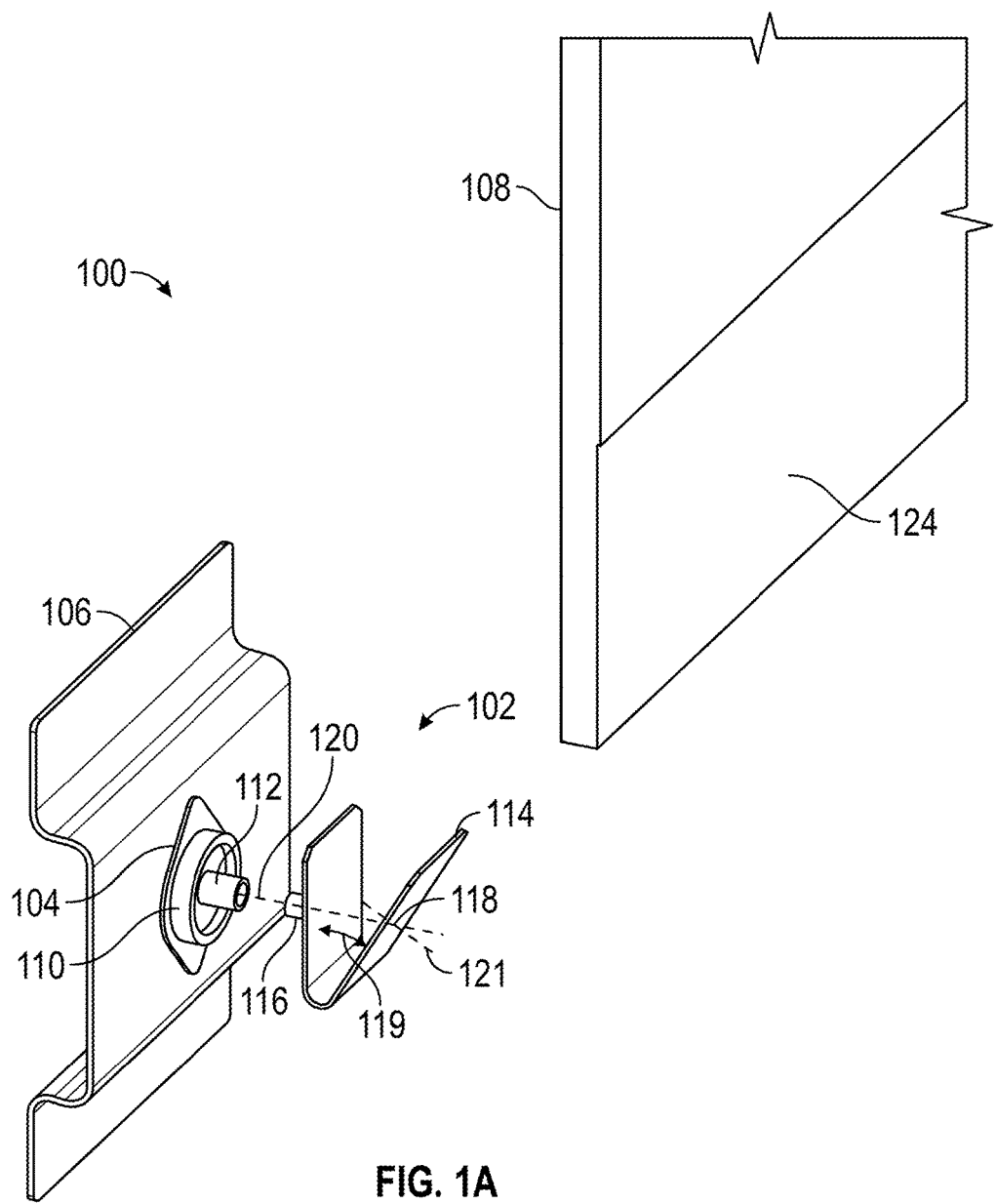
FIG. 1A is a schematic view of a panel installation tool according to a first exemplary embodiment of the invention.
Figure 1B:
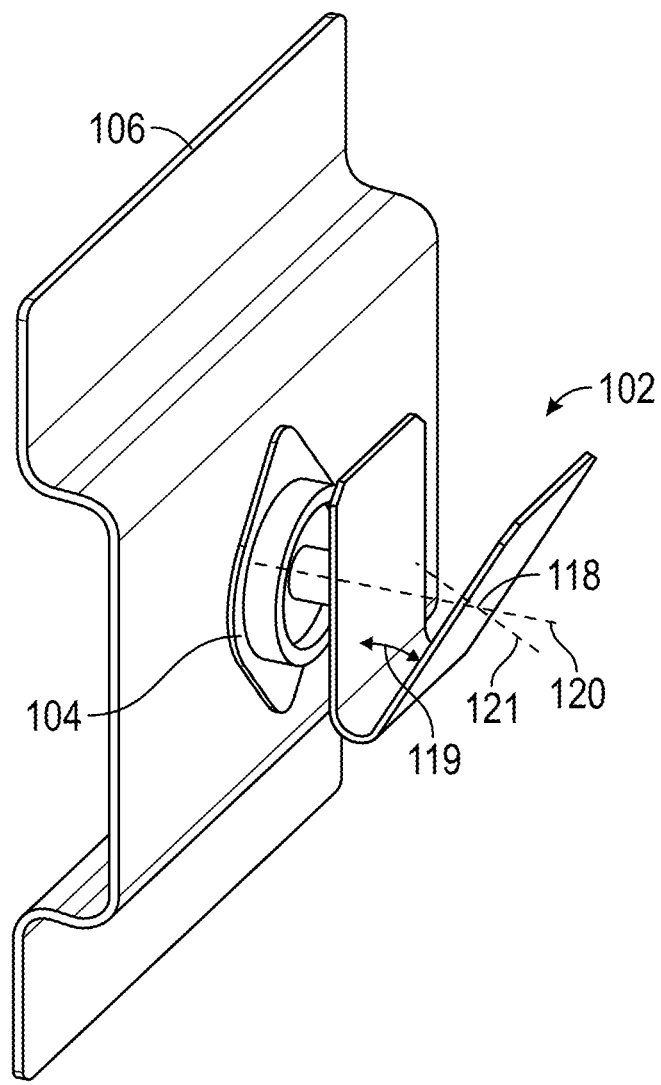
FIG. 1B is a schematic view of the panel installation tool of FIG. 1A as installed within a structural feature and in a first configuration.

FIG. 1B is a schematic view of the panel installation 100 of FIG. 1A with the locating tool 102 installed within a structural feature and in a first configuration. FIG. 1D is a schematic view of the panel installation 100 of FIG. 1A with locating tool 102 installed within a structural feature and in a second configuration. FIG. 1D is a schematic view of the panel installation 100 and locating tool 102 of FIG. 1A supporting a panel in accordance with the first exemplary embodiment of the invention.

Tool 102 is a locating tool configured to enable simple locating of isolators, such as isolator 104, which may be engaged with, attached to, and/or part of a structural component 106. Structural component 106 may be an H-bracket, support bracket, or other structure to which a panel may be attached. The structural component 106 may further be part of a structural wall or similar feature that is configured to have a panel 108, such as an upholstery panel, attached thereto (See FIGS. 3A and 3B).

As shown in FIG. 1A, the structural wall or similar feature is omitted, as those of ordinary skill in the art will readily understand the configurations and features of such a structure, and further how the structural component 106 attaches thereto. However, see FIGS. 3A and 3B for an example of such structure. Structural component 106 may be welded to a wall or similar feature, molded and/or integral therewith, or attached by other fixed and/or removable means, such as fasteners, rivets, glue, etc. Structural component 106 is configured to lift or separate an installed panel, such as panel 108, from a surface of the wall or similar feature. A plurality of structural components 106 may be used to provide a single plane such that panel 108 may be installed to the wall or similar feature in a level fashion.

In order to enable panel 108 to attach to or be retained by the structural component 106, isolators 104 may be provided therein. Isolator 104 can be configured to removably or fixedly attach to the structural component 106 and provide additional separation of the panel 108 from the wall or similar feature. Isolator 104 may be a separate component retained or held within the structural component 106 or may be integral with the structural component 106.

Isolator 104, as shown, has a base 110 and a stem 112. Base 110 of isolator 104 is configured to support and retain the isolator 104 to the structural component 106, or base 110 may be an integral part of the structural component 106, depending on the configuration. Extending from the base 110 in a direction away from the structural component 106 is the stem 112. Stem 112 may be a cylinder or similar structure that has an exterior wall and a central open shaft with an interior surface. The interior surface of the central shaft of the stem 112 may be threaded, ribbed, smooth, or have any other configuration. The structure of the interior surface of stem 112 may be configured to engage with a retaining element, not shown, that will hold or retain the panel 108 to the structural component 106 through isolator 104. The retaining element may be a screw, rivet, pin, or any other type of fastener or retaining element that is configured to hold or retain a panel to a structural component.

During traditional installation, the locating tool 102 is not present, and a technician or other person must guess, with some aids, the appropriate location to drill through a panel, such as panel 108. The drilled hole enables the retaining element to pass through the panel 108 and engage with the isolator 104. If the drilled holes are not correctly aligned on the panel 108, the retaining element may not be able to engage with the isolator 104 or the panel may be installed crooked, slanted, etc., or multiple attempted drillings may be made, thus putting multiple holes through the panel.

In order to facilitate accurate marking of the panel 108, and thus enable accurate installation of the panel 108 to the structural component(s) 106, locating tool 102 is provided. Locating tool 102, as shown in a first exemplary embodiment, is a form of clip or other support structure that has a relatively "U" or "V" shape. Locating tool 102 may be formed from aluminum, composites, and/or other materials that provide elasticity and rigidity in order to be flexible and adjust shape but to also retain the shape once adjusted. The "U" or "V" shape may be part of or form a first portion 114 of the locating tool 102 that is configured to support a panel 108, and thus may be referred to as a panel support. The first portion 114 is configured to adjust between at least a first configuration and a second configuration, as described below. The locating tool 102 also includes a second portion 116 that is configured to engage with the stem 112 of the isolator 104. The second portion 116 of isolator 104 may be threaded, ribbed, smooth, etc. and configured to removably engage with the stem 112. Further, the first portion 114 and the second portion 116 may be integrally formed or may be separate components fixedly or removably attached to each other.

The first portion 114 of locating tool 102 includes a location indicator 118, such as an aperture or hole that passes through the material of the first portion 114. The location indicator 118 may be located on only one portion of the first portion 114, e.g., on one side of the "U" or "V" shape, as shown in FIGS. 1A, 1B, 1C, 1D. Further, although shown as an aperture or hole through the material of the locating tool, those of skill in the art will appreciate that the location indicator 118 may be configured as a pit, depression, indentation, etc., such that a mark is made or able to be made on a panel 108.

Referring now to FIGS. 1A-1D in sequence, the installation process of using the locating tool 102 will be explained. With reference to FIG. 1A, the locating tool 102 is positioned to have the second portion 116 engage with the stem 112 of the isolator 104. As shown, locating tool 102 is in a first configuration that is relatively open or spread, herein after referred to as "open configuration." The material that is used to form the locating tool 102, as noted above, is selected to allow for the locating tool 102 to maintain the open configuration with relative rigidity, but also enables the locating tool 102 to be adjusted into other configurations without damage or substantial damage occurring thereto, such as wear, fatigue, material and/or structural weakening, etc. In the open configuration the location indicator 118 is skew from or not aligned with the second portion 116 of locating tool 102, with a distance 119 between two walls of the first portion 114. As shown, an axis 120 that passes through stem 112 and second portion 116 is skew from (not aligned or parallel) an axis 121 that passes through location indicator 118 in first portion 114.

Referring now to FIG. 1B, the locating tool 102 is engaged and retained within and to the isolator 104. The locating tool 102 is configured, by the configuration of second portion 116, to be releasably and/or removably engaged with the isolator 104, and specifically the second portion 116 engages with the stem 112 of isolator 104. As shown in FIG. 1B, the locating tool 102 is still in the open configuration.

Figure 1C:
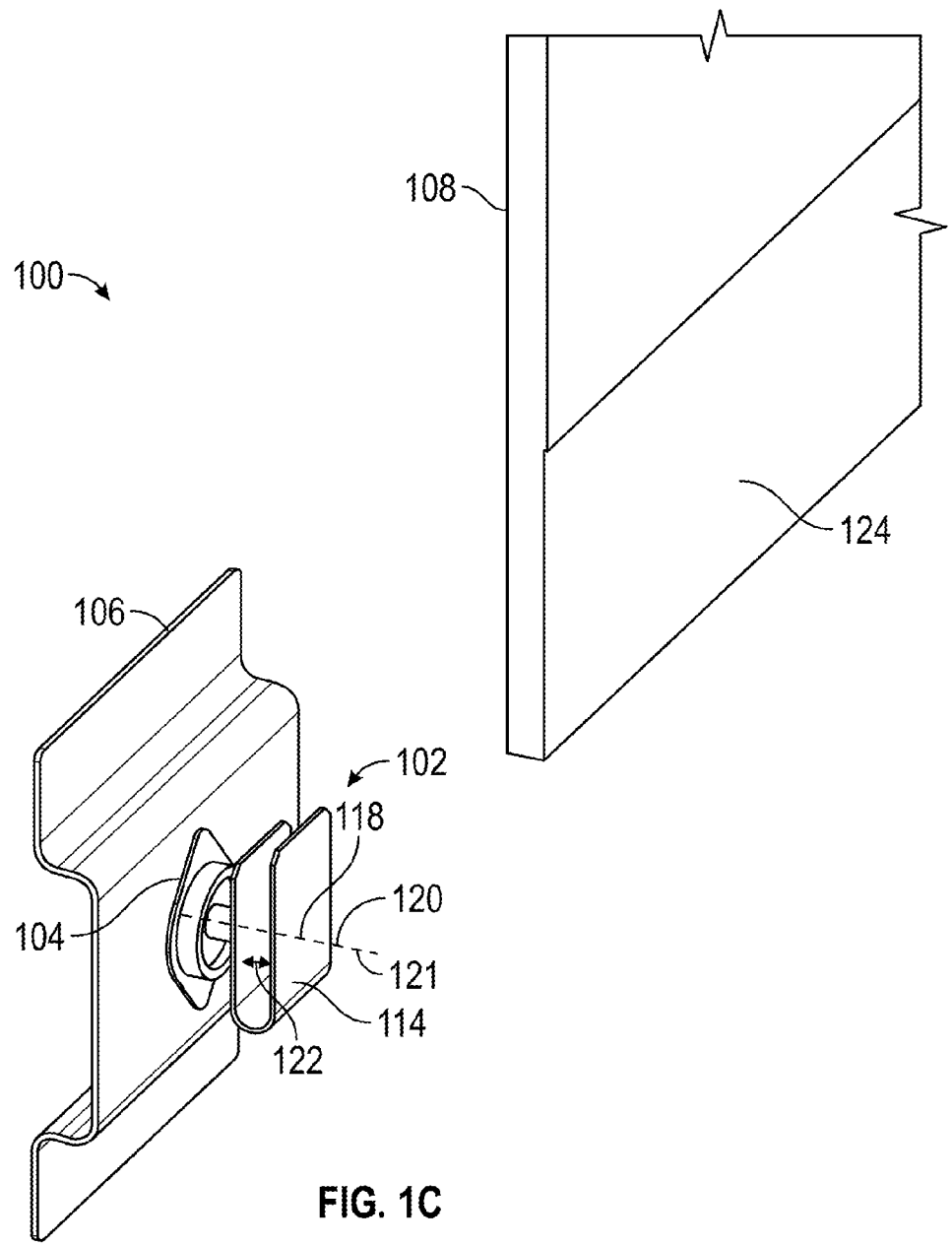
FIG. 1C is a schematic view of the panel installation tool of FIG. 1A as installed within a structural feature and in a second configuration.
Figure 1D:
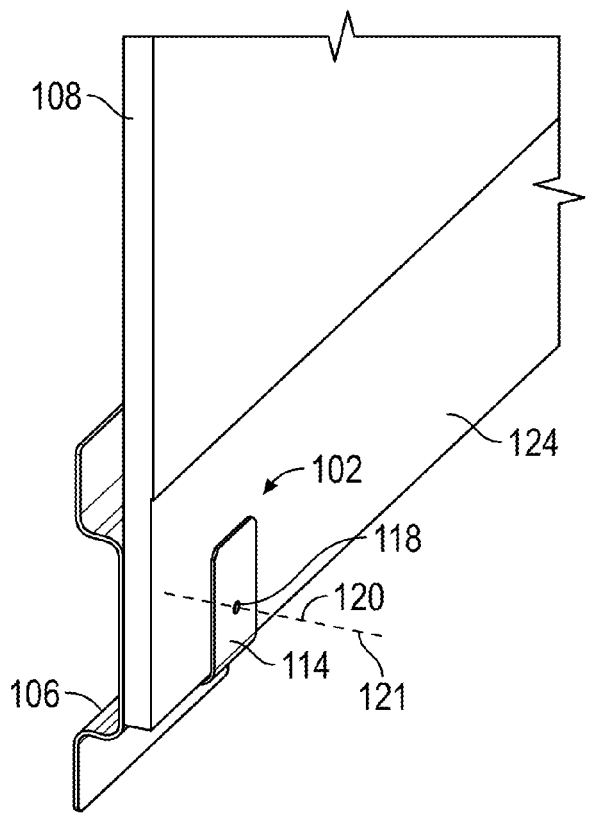
FIG. 1D is a schematic view of the panel installation tool of FIG. 1A supporting a panel in accordance with the first exemplary embodiment of the invention.

Turning now to FIG. 1C, the locating tool 102 is now shown in a second or closed configuration. In the closed configuration, the location indicator 118 is aligned with the central shaft of stem 112. Specifically, when in the closed configuration, axis 120 and axis 121 are aligned and/or parallel, as shown in FIG. 1C. To shift from the open configuration to the closed configuration, the first portion 114 of locating tool 102 may be plastically bent or adjusted manually with use of one or more tools. In the closed configuration, the locating tool 102 is configured to define a distance 122 between the two walls of the first portion 114. Distance 122 is defined or set to be about the width of a panel, such as panel 108, and thus is configured to hold or support panel 108 for the purpose of marking the panel 108, as shown in FIG. 1D. Alternatively, panel 108 may be placed within the first portion 114 when the locating tool 102 is in the open configuration and then the first portion 114 may be adjusted to the closed position.

In FIG. 1D, panel 108 is held and supported by locating tool 102, within first portion 114. Panel 108 includes a marking surface 124, which may be paper, masking tape, etc., or may be an exterior surface of panel 108 that is able to receive a marking thereon. With panel 108 supported within locating tool 102, a user can mark, through location indicator 118 the location of the isolator 104 and the stem 112 thereof, accurately and quickly. For example, a user can use a pen or similar marking device and mark a circle or outline of the location indicator 118 directly onto the marking surface 124 of the panel 108. Because the axis 120 and the axis 121 are aligned, the marking on the marking surface 124 (or on the panel 108) made by using location indicator 118 will accurately represent the location of where a retaining element will be used to retain and hold the panel 108 to the structural component 106.

The panel 108 can then be removed from the locating tool 102, before or after adjusting the locating tool 102 from the closed position to the open position, and a hole or aperture may be drilled or formed through the panel 108 and the marking surface 124 may be removed from the panel 108. Additionally, the locating tool 102 can be removed from the isolator 104. With the holes in the panel 108 accurately placed and formed, the panel 108 may be accurately installed and attached to the isolator 104 and thus to the structural component 106.

Figure 2A:
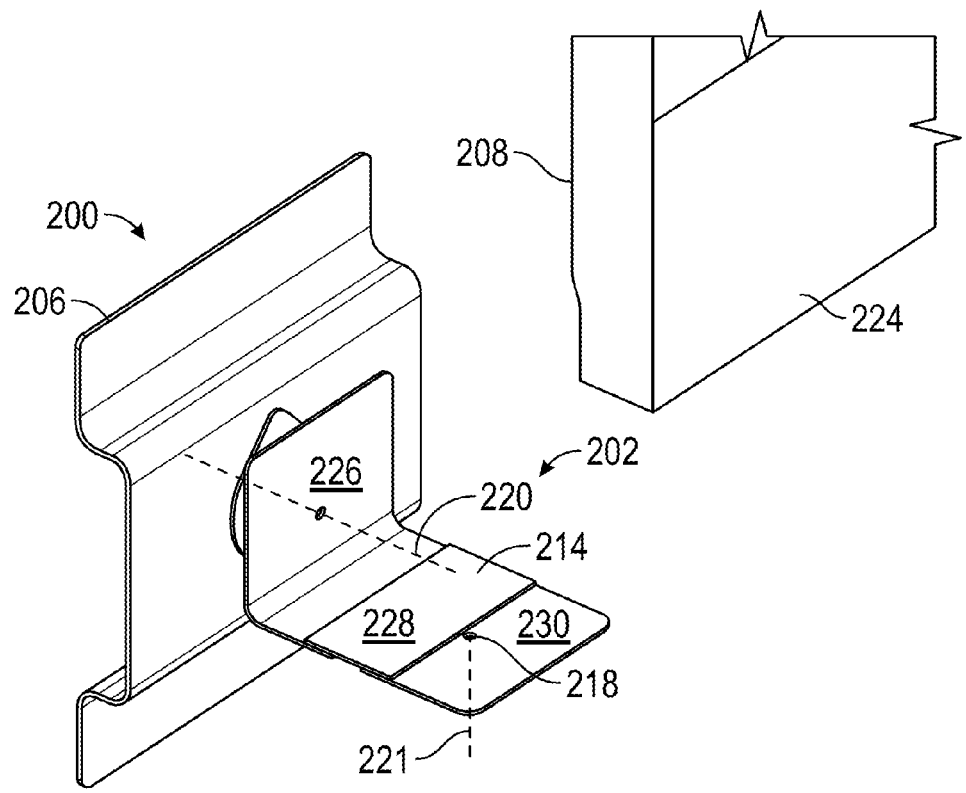
FIG. 2A is a schematic view of a panel installation tool according to a second exemplary embodiment of the invention in a first configuration.
Figure 2B:
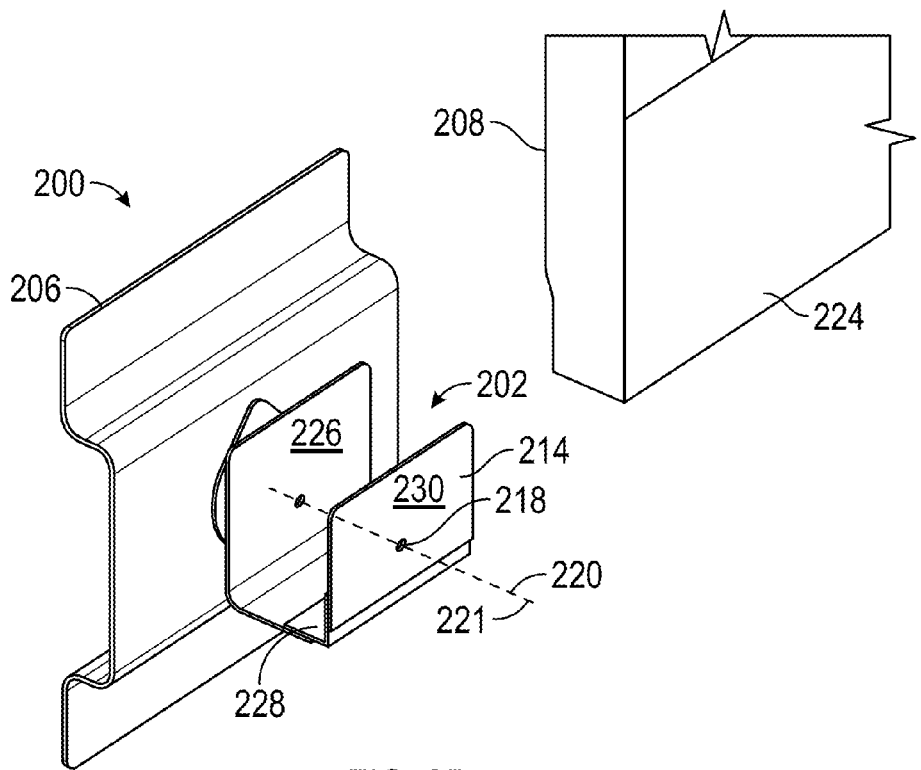
FIG. 2B is a schematic view of the panel installation tool of FIG. 2A in a second configuration.
Figure 2C:
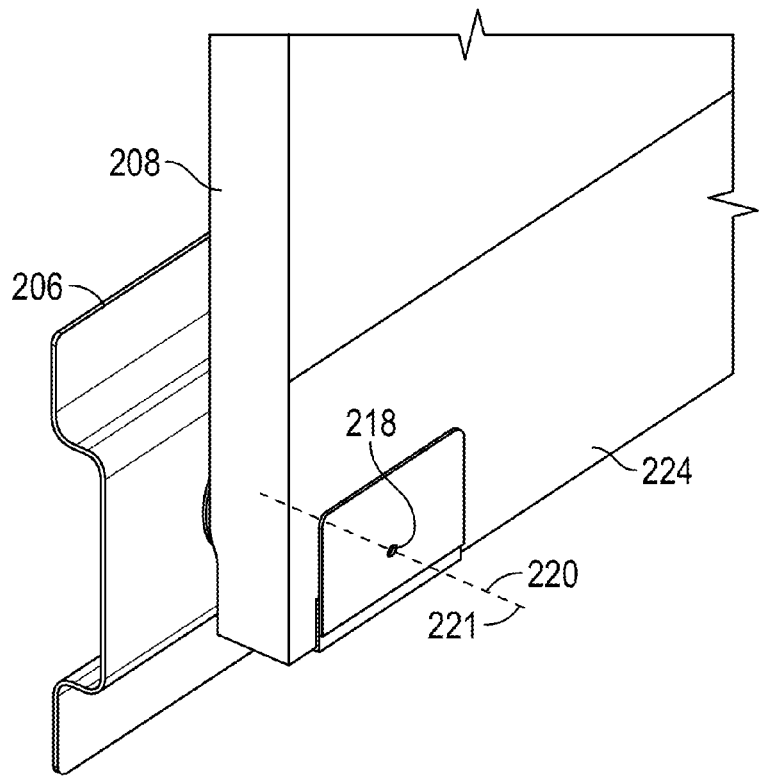
FIG. 2C is a schematic view of the panel installation tool of FIG. 2A supporting a panel in accordance with the second exemplary embodiment of the invention.

Turning now to FIGS. 2A-2C, a second exemplary embodiment of the invention is shown. Features shown in FIGS. 2A-2C may be substantially similar to that discussed above with respect to FIGS. 1A-1D and thus similar features will have similar reference numerals, but preceded by a "2" rather than a "1." Installation 200 includes a locating tool 202 configured to allow marking of a panel 208 and thus enable accurate and efficient mounting of a panel 208 to a structural component 206 through means of an isolator 204. Isolator 204 is substantially similar to isolator 104 of FIGS. 1A-1D and includes a base portion and a stem, as described above with respect to isolator 104.

In the embodiment of FIGS. 2A-2C, panel 208 is relatively thicker than panel 108, and thus the configuration and operation of locating tool 202 is different from the locating tool 102. For example, the panel 108 of FIGS. 1A-1D may be on the order of about ⅛ to ¼ inch thick, whereas panel 208 may be on the order of about 1 inch thick. To accommodate the larger thickness of panel 208, the locating tool 202 is constructed of multiple elements.

With reference to FIG. 2A, a first portion 214 of locating tool 202, as shown, includes a first element 226, a second element 228, and a third element 230. First element 226 is attached to a second portion (not shown) of locating tool 202, which may be substantially similar to second portion 116 of locating tool 102. The first element 226 is attached to or includes a second portion that is configured to releasably and/or removably engage with a stem of an isolator 204, as discussed above. As shown in FIG. 2A, the first element 226 forms an "L" shape with a vertical wall or panel that is attached to the second portion and parallel to the structural component 206. The first element 226 also includes a horizontal wall or panel that is perpendicular to the structural component 206 when the locating tool 202 is attached to the isolator 204. The horizontal wall or panel of locating tool 202 is configured to support, at least in part, a panel 208 when the panel 208 is retained by the locating tool 202.

The second element 228 of locating tool 202 is configured as a hinged or bendable element and is attached to the first element 226 and the third element 230. The attachment between the first, second, and third elements 226, 228, and 230, may be a fixed attachment or may be a releasable attachment, depending on the needs of the locating tool 202. Third element 230 includes a location indicator 218 and is movable or adjustable from a first or open configuration, shown in FIG. 2A, to a second or closed configuration shown in FIG. 2B. When in the second or closed configuration, the location indicator 218 in third element 230 aligns with the stem of the isolator 204, similar to the operation of locating tool 102. For example, axis 220 and axis 221 are perpendicular or skew when in the open position (FIG. 2A) and parallel or aligned when in the closed position (FIG. 2B). Although described with first element 226 forming an "L" shape, those of skill in the art will appreciate that other configurations of the second exemplary embodiment may be made without departing from the scope of the invention. For example, the hinge in second element 228 may be located elsewhere, or may be made integral with either or both of the first element 226 and the third element 230.

Turning to FIG. 2C, the panel 208 is shown supported by locating tool 202. A user can then use location indicator 218 to mark the panel 208 or a marking surface 224 thereof. The panel 208 and locating tool 202 can then be removed, a hole made through the panel 208, the marking surface 224 removed (if present), and the panel 208 can be installed to the isolator 204 and structural component 206 by means of a retaining element installed through the hole in the panel 208.

Figure 3A:
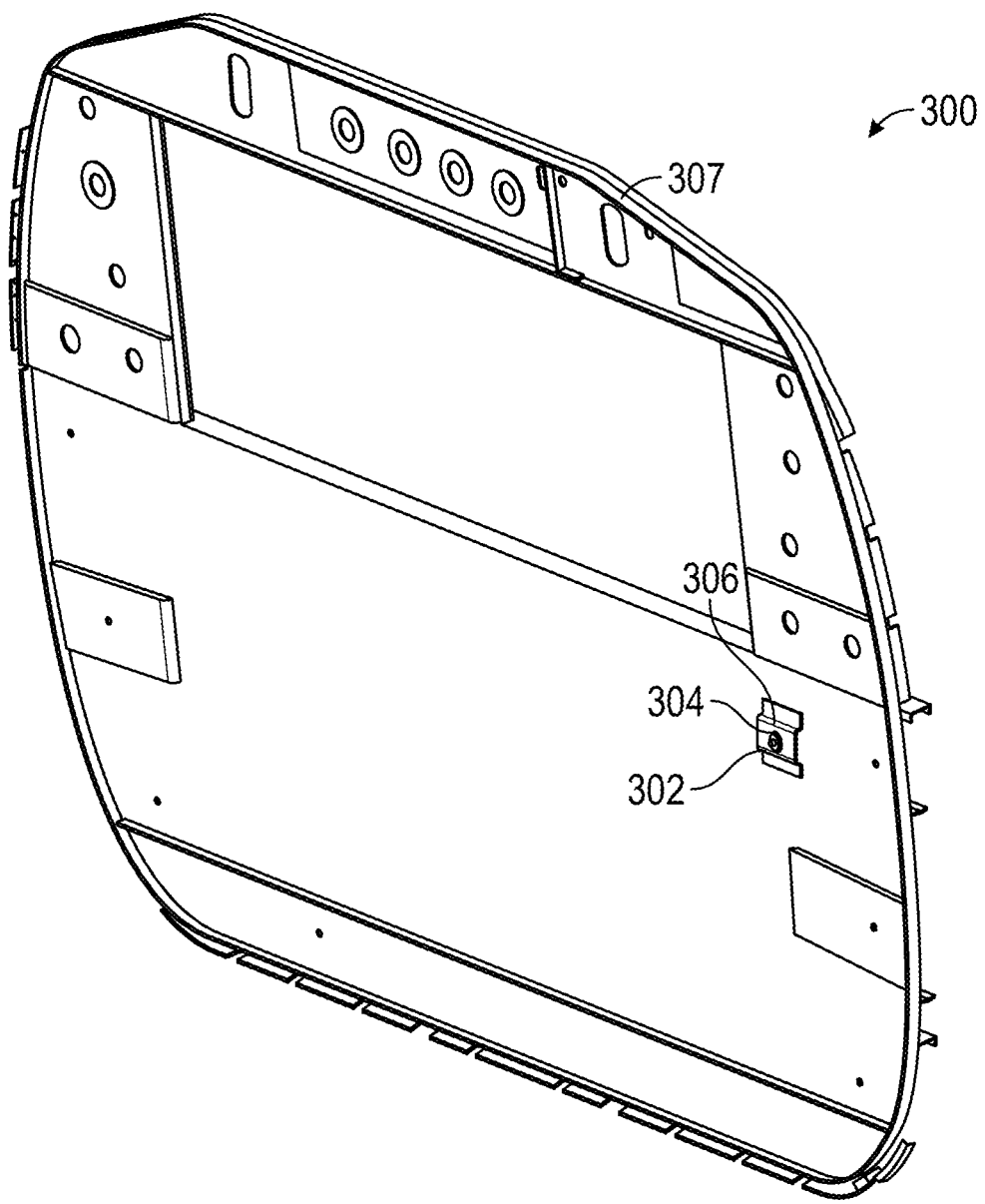
FIG. 3A is a schematic view of a structural feature to which a panel may be installed.
Figure 3B:
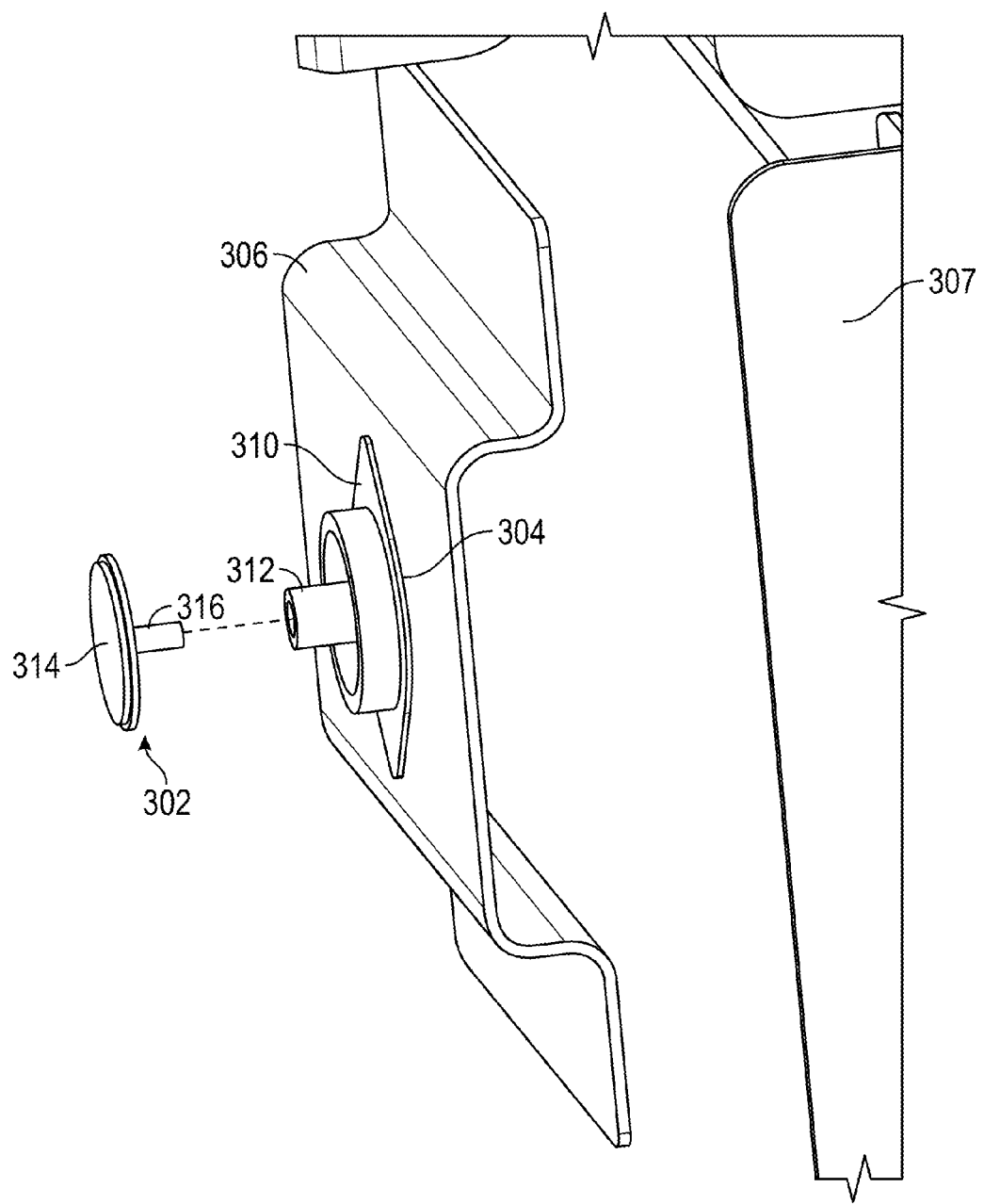
FIG. 3B is a close-up schematic view of the structural feature of FIG. 3A showing an isolator used to retain a panel.

Turning now to FIGS. 3A-3B, a third exemplary embodiment of the invention is shown. Features shown in FIGS. 3A-3B may be substantially similar to that discussed above with respect to FIGS. 1A-1D and FIGS. 2A-2C, and thus similar features will have similar reference numerals, but preceded by a "3" rather than a "1" or a "2." In FIGS. 3A-3B, the structural component 306 is part of a structural wall 307 or similar feature which may be part of a vehicle or building. Those of skill in the art will appreciate that structural components 106 and 206 may be similarly arranged on a structural wall or similar feature, as shown in the example of FIG. 3A. Further, although shown in FIG. 3A with a single structural component 306, those of skill in the art will appreciate that structural wall 307 may have any number of structural components 306 and associated isolators 304 without departing from the scope of the invention. As will be appreciated, the number of structural components 306 and isolators 304 may be determined by the needs of the installation and/or by the weight, shape, configuration, etc. of the panel that is to be installed to the structural wall 307.

Turning now to FIG. 3B, an alternate view of the third configuration of the locating tool 302 is shown. Locating tool 302 includes a first portion 314 and a second portion 316. Second portion 316 may be substantially similar to second portion 116 of locating tool 102, discussed above. First portion 314, however, is different from the configurations of locating tools 102 and 202. In this third exemplary embodiment, first portion 314 comprises a single surface that is parallel with a surface of a panel to which it will removably and/or releasably attach and/or parallel to a plane defined by one or more structural components 306. First portion 314 may be configured as double-sided tape, such that a releasable adhesive will adhere to a surface of a panel. Then, when the panel is removed from temporary placement, the first portion 314 and second portion 316 will be removed and adhered to the panel, to enable marking. The first portion 314 and second portion 316 may then be removed from the panel, after marking, and an appropriate hole may be drilled through the panel for permanent installation.

In an alternative embodiment, the first portion 314 can separate from the second portion 316, and be retained on the panel for the purpose of marking the panel. In other alternative embodiments of the third exemplary embodiment, the first portion 314 may be configured to mark or make an indication on the panel or a marking surface of a panel. For example, first portion 314 may be configured with spikes, stakes, needles, protrusions, inks, paints, dyes, or other types of structures and/or materials that can provide a mark or indication of the location of the isolator 304 and/or the stem 312 of the isolator 304.

In some embodiments where the first portion 314 removably attaches to the panel, with or without the second portion 316, a user can make a mark based on the location of the attached first portion 314, remove the first portion 314 from the panel, and then proceed to drill or form a hole through the panel. The panel may then be attached to the isolator 304 using a retaining element installed through the hole and engaging with the isolator 304.

Advantageously, embodiments of the invention provide an efficient and accurate means of marking or assisting in marking a panel that is to be mounted to a structural component. Further, advantageously, locating the isolator for mounting a panel and marking the panel can be made without any required measurements. Further, advantageously, even without measurements, the locating tool of embodiments of the invention provides a very accurate, quick, and efficient process for enabling mounting panels to a structural component by providing an accurate location of where an isolator and/or stem of an isolator is located with respect to the panel.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments and/or features.

For example, engagement of the locating tool with the isolator may be by screw, snap-fit, slideable engagement, or other form of engagement without departing from the scope of the invention. As such, the second portion of the locating tool that is configured to engage with the isolator may be threaded, ribbed, grooved, smooth, etc. Further, as noted above, the location indicator of the locating tool may be an aperture through a portion of the locating tool; however, those of skill in the art will appreciate that the location indicator may be configured as a structure or material that directly marks a panel or marking surface of a panel. For example, if the second portion includes a structure it may be a tack, nail, Velcro®, hook-and-loop, pin, spike(s), knob, bump, protrusion, etc. Further, if the second portion is formed or includes a material for marking, the materials may include, for example, inks, dyes, paints, etc., that may transfer from the first portion to the panel or marking surface of the panel.

Further, the materials described herein that are used to form the locating tool are not limiting. Particularly, the material used to form the locating tool may be any material or combination of materials that enable the locating tools to provide the above described features. Thus, in some embodiments, portions of the locating tools may be formed of aluminum, composites, plastics, rubbers, various metals, and/or combinations thereof, without departing from the scope of the invention.

Further, although described with respect to specific combinations of features within the above described embodiments, those of skill in the art will appreciate that various features of the various embodiments disclosed herein may be mixed, matched, and/or combined without departing from the scope of the invention. Thus the three exemplary embodiments described above are provided merely for exemplary and explanatory purposes and are not limiting embodiments to the invention.

Further, those of skill in the art will appreciate that the locating tools described herein may be used in any vehicle, building, structure, etc. where paneling is desired to be installed and thus the application of the locating tool of the invention is not limiting.

Accordingly, the invention is not to be seen as limited by the foregoing description, but is only limited by the scope of the appended claims.

What is claimed is:

1. A panel installation tool comprising:
   a first portion configured to releasably engage with a panel;
   a second portion attached to the first portion and configured to releasably engage a structural component to retain the first portion with respect to the structural component; and
   a location indicator positioned at the first portion and configured to enable marking on a panel surface a location through which a retaining element may be used to retain the panel to the structural component, wherein the first portion is transformable between an open configuration and a closed configuration relative to the second portion.

2. The panel installation tool of claim 1, wherein the first portion and the second portion are integrally formed.

3. The panel installation tool of claim 1, wherein the location indicator and the first portion are integrally formed.

4. The panel installation tool of claim 1, wherein, when in the closed position, a panel may be releasably retained within the first portion.

5. The panel installation tool of claim 1, wherein the first portion includes a hinge.

6. The panel installation tool of claim 1, wherein the location indicator is an aperture through the first portion.

7. The panel installation tool of claim 1, wherein the location indicator comprises double-sided tape.

8. The panel installation tool of claim 1, wherein the location indicator is at least one of a protrusion, a dye, an ink, a paint, a spike, and a needle.

9. The panel installation tool of claim 1, wherein the location indicator is removably attached to the first portion and configured to transfer from the first portion to a panel when the first portion engages with the panel.

10. The panel installation tool of claim 1, wherein the first portion forms a "U" shape or a "V" shape.

11. The panel installation tool of claim 1, wherein the second portion is one of a smooth cylinder, a ribbed cylinder, and a threaded cylinder.

\* \* \* \* \*